United States Patent
Bolms et al.

(10) Patent No.: US 9,597,751 B2
(45) Date of Patent: Mar. 21, 2017

(54) METHOD FOR PRODUCING A HOLE WITH SIDE-DELIMITING FLANKS IN A COMPONENT

(75) Inventors: Hans-Thomas Bolms, Mülheim an der Ruhr (DE); Jan Münzer, Berlin (DE); Thomas Podgorski, Oranienburg OT Lehnitz (DE); Lutz Wolkers, Düsseldorf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1382 days.

(21) Appl. No.: 12/381,835

(22) Filed: Mar. 17, 2009

(65) Prior Publication Data

US 2009/0283508 A1 Nov. 19, 2009

(30) Foreign Application Priority Data

Mar. 28, 2008 (EP) .................... 08006084

(51) Int. Cl.
*B23K 26/38* (2014.01)
*B23K 26/384* (2014.01)
*B23K 26/382* (2014.01)
*B23K 101/00* (2006.01)

(52) U.S. Cl.
CPC .......... *B23K 26/384* (2015.10); *B23K 26/382* (2015.10); *B23K 26/389* (2015.10); *B23K 2201/001* (2013.01)

(58) Field of Classification Search
CPC ............ B23K 2201/001; B23K 26/381; B23K 26/382; B23K 26/383; B23K 26/384; B23K 26/388; B23K 26/389

USPC ..................................................... 219/121.71
See application file for complete search history.

(56) References Cited

U.S. PATENT DOCUMENTS

| | | | |
|---|---|---|---|
| 6,229,113 B1 | 5/2001 | Brown | |
| 6,420,677 B1 | 7/2002 | Emer | |
| 7,411,989 B2 * | 8/2008 | Spinelli et al. | ................. 372/55 |
| 2003/0127438 A1 * | 7/2003 | Richter et al. | ........... 219/121.71 |
| 2004/0164060 A1 * | 8/2004 | Maeda et al. | ............ 219/121.71 |
| 2007/0119832 A1 * | 5/2007 | Beck et al. | .............. 219/121.71 |
| 2011/0036819 A1 * | 2/2011 | Munzer et al. | .......... 219/121.71 |

FOREIGN PATENT DOCUMENTS

| | | |
|---|---|---|
| CN | 1849194 A | 10/2006 |
| EP | 1806203 A1 | 7/2007 |
| JP | 2000141069 A | 5/2000 |
| JP | 2003516864 A | 5/2003 |
| JP | 2005347415 A | 12/2005 |
| JP | 2007021548 A | 2/2007 |
| JP | 2007105732 A | 4/2007 |
| JP | 2007294743 A | 11/2007 |
| JP | 2008502897 A | 1/2008 |

(Continued)

*Primary Examiner* — Tu B Hoang
*Assistant Examiner* — Diallo I Duniver

(57) ABSTRACT

A method for producing a hole with side-delimiting flanks in a component using a laser beam is provided. A laser beam is directed onto the component. A side flank of the hole is traced with the laser beam. A partial volume of the hole is formed by vaporizing the component material. This is repeated until the whole volume is formed. The laser beam may be oriented so that it includes an angle of more than 8° with the traced side flank.

21 Claims, 2 Drawing Sheets

(56) References Cited

FOREIGN PATENT DOCUMENTS

| | | |  |
|---|---|---|---|
| JP | 2008055456 A | 3/2008 | |
| RU | 2085351 C1 | 7/1997 | |
| SU | 1691017 A1 | 11/1991 | |
| SU | 1812033 A1 | 4/1993 | |
| WO | WO 2004062841 A1 | 7/2004 | |
| WO | WO 2006069822 A1 | 7/2006 | |
| WO | WO 2007043884 A2 * | 4/2007 | ............. B23K 26/04 |
| WO | WO 2007080060 A1 | 7/2007 | |

* cited by examiner

METHOD FOR PRODUCING A HOLE WITH SIDE-DELIMITING FLANKS IN A COMPONENT

CROSS REFERENCE TO RELATED APPLICATIONS

This application claims priority of European Patent Office application No. 08006084.1 EP filed Mar. 28, 2008, which is incorporated by reference herein in its entirety.

FIELD OF INVENTION

The invention refers to a method for producing a hole, with side-delimiting flanks, in a component, in which a laser beam is directed onto the component surface so that component material is vaporized and the hole is formed.

BACKGROUND OF INVENTION

Methods for producing holes with side-delimiting flanks are known in the prior art. So, for example, a method for laser-assisted formation of cooling air holes in turbine blades is described in U.S. Pat. No. 6,420,677. In this case, provision is made to discharge a sequence of laser pulses onto the turbine blade surface, wherein parts of the turbine material are vaporized so that a hole is formed along a Z-axis. The laser beam is discharged onto the blade surface in an inclined manner by angles of +/−10-20° in relation to the Z-axis during the machining.

SUMMARY OF INVENTION

During the production of the cooling air holes, impermissible interactions between the laser beam and the flank of the hole can occur. Such a disadvantageous interaction occurs when the laser beam is directed onto the blade surface during the machining so that it extends in a region close to, and parallel with, the side flank. In this region between the laser beam and the flank an interaction then occurs, as a result of which some of the energy of the laser beam is absorbed by the flank. This leads to the flank of the hole being damaged.

It is therefore the object of the present invention to disclose a method of the type mentioned in the introduction in which no damage to the hole flank occurs as a result of interaction with the laser beam.

This object is achieved according to the invention by a partial volume of the hole being formed in a plurality of production steps in each case by tracing a side flank of the hole with the laser beam, wherein the laser beam is oriented so that it includes an angle of more than 8° with the traced flank.

It is therefore the fundamental idea of the invention to divide the overall volume of the hole which is to be produced into partial volumes and to form these in individual production steps. The component material of the individual partial volumes is removed by a side flank of the hole being traced in each case with the laser beam. In doing so, the laser beam is oriented so that it includes an angle of more than 8° with the traced flank.

Since the laser beam during the production of the hole is not directed onto the component surface close to, and parallel with, the already-formed flank of the hole, an impermissible interaction occurring between the laser beam and the flank is excluded. Furthermore, the division of the overall volume of the hole into a plurality of partial volumes allows complex hole geometries to be formed.

According to a first embodiment of the invention, provision is made for the laser beam to be oriented so that it includes an angle of more than 10° and less than 90°, preferably of more than 15° and less than 80°, and especially preferably of more than 20° and less than 60°, with the traced flank. An angle of 9° is especially preferred.

In a development of the invention, provision is made for directing a pulsed laser beam onto the component surface. In this case, a laser beam with variable pulse width can be used. The pulse width can lie in the range of 50 to 800 ns, preferably of 70 to 600 ns, and especially of 200 to 500 ns. A pulse width of 400 ns is especially preferred.

With such a pulsed laser beam the component material can be vaporized particularly quickly.

A laser beam with a frequency in the range of 20 to 40 kHz, preferably of 25 to 35 kHz, and especially of 28 to 32 kHz, can advantageously also be directed onto the component surface.

A preferred development of the invention makes provision for a hole to be produced in a turbine component, especially in a turbine blade. The hole can especially be a complete cooling air hole or a diffuser opening of a cooling air hole.

BRIEF DESCRIPTION OF THE DRAWINGS

The invention is explained in more detail in the following text based on an exemplary embodiment with reference to the drawings.

In the drawings.

DETAILED DESCRIPTION OF INVENTION

Figure 1:
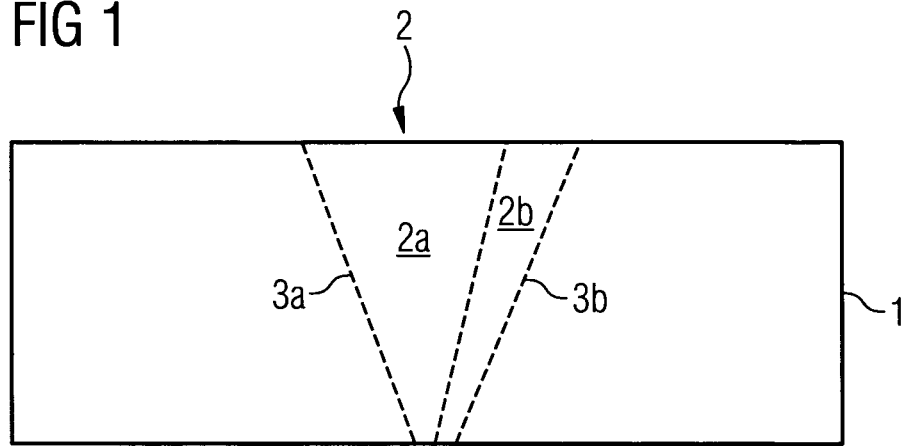
FIG. 1 shows a schematic view of a component in which a hole is to be produced with a method according to the invention.
Figure 2:
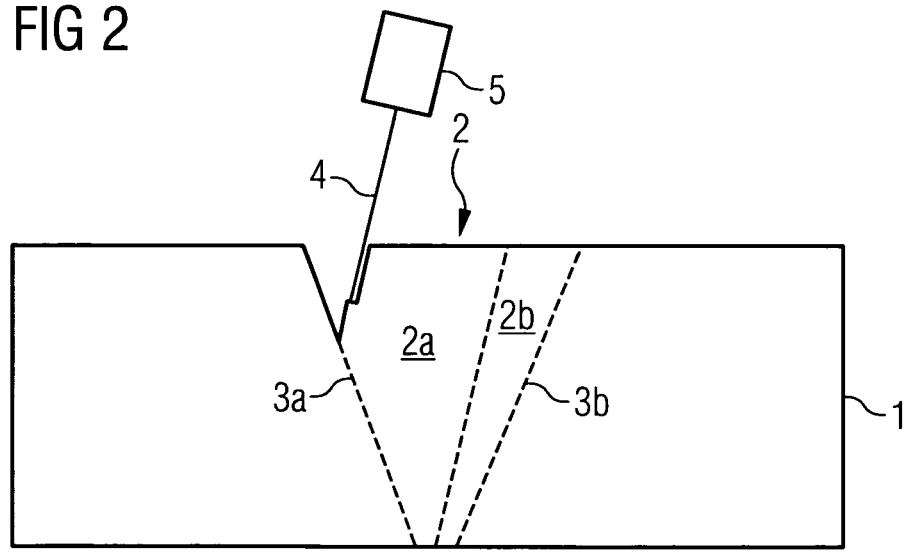
FIG. 2 shows a schematic view of the component of FIG. 1 during the production of a first partial volume of the hole.
Figure 3:
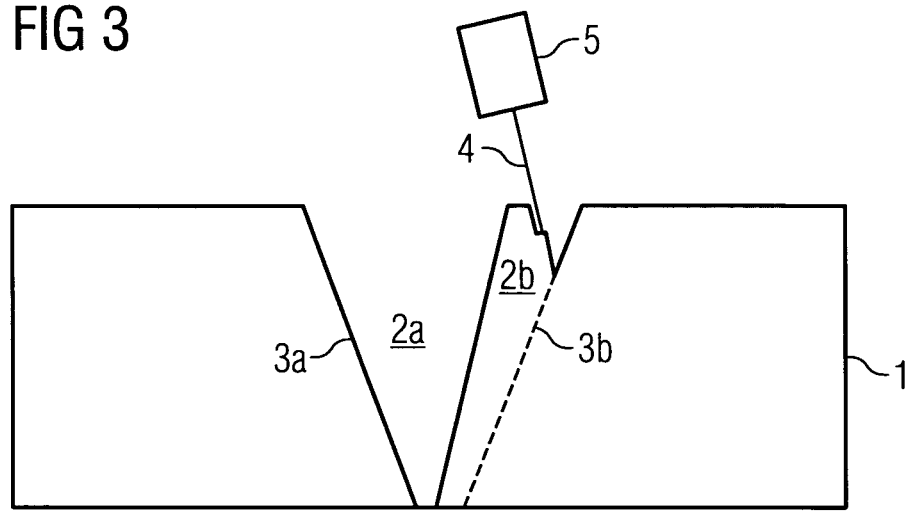
FIG. 3 shows a schematic view of the component of FIG. 1 during the production of a second partial volume of the hole.

In FIGS. 1 to 3, the production of a hole 1 in a component 2 is schematically shown. The component 2 can especially be a turbine blade in which a cooling air hole is formed.

FIG. 1 shows the component 1 before commencement of the method, wherein the flanks 3a and 3b, which on the right and left delimit the hole 2 which is to be produced at the sides, are indicated with broken lines. The overall volume of the hole 2 which is to be produced is divided into a left-hand and a right-hand partial volume 2a and 2b also with a broken line. The production of the left-hand partial volume 2a is shown in FIG. 2, and FIG. 3 illustrates the production of the right-hand partial volume 2b.

In order to form the left-hand partial volume 2a of the hole 2 in the component 1 in a first production step, a laser beam 4 from a laser 5 is discharged onto the component surface. In doing so, the laser 5 is oriented so that the laser beam 4 includes an angle of more than 5° with the left-hand flank 3a, and first strikes the region of the left-hand partial volume 2a which is directly adjacent to the left-hand flank 3a, where it vaporizes some of the component material.

The laser beam 4 is further directed onto the component surface until it reaches the left-hand flank. The laser 5 is then moved to the right in the drawing so that the laser beam 4 strikes component material which is still present in the partial volume 2a, which material is then vaporized in turn as far as the left-hand flank 3a. In this way, the entire flank 3a of the partial volume 2a is traced with the laser beam 4.

After the entire partial volume 2a of the hole 2 has been produced in this way, the laser 5 is rotated anticlockwise and oriented so that the laser beam 4 includes an angle of more than 8° with the right-hand flank 3b and first strikes the region of the right-hand partial volume 2b which is directly adjacent to the right-hand flank 3b, where it vaporizes some of the component material. Then, in the way which is described above, the right-hand flank 3b is traced with the laser beam 4 in order to also produce the right-hand partial volume 2b.

During the production of the hole 2, no impermissible interaction occurs between the laser beam 4 and one of the two flanks 3a, 3b. Therefore, damage to the flanks of the hole is excluded.

Figure 4:
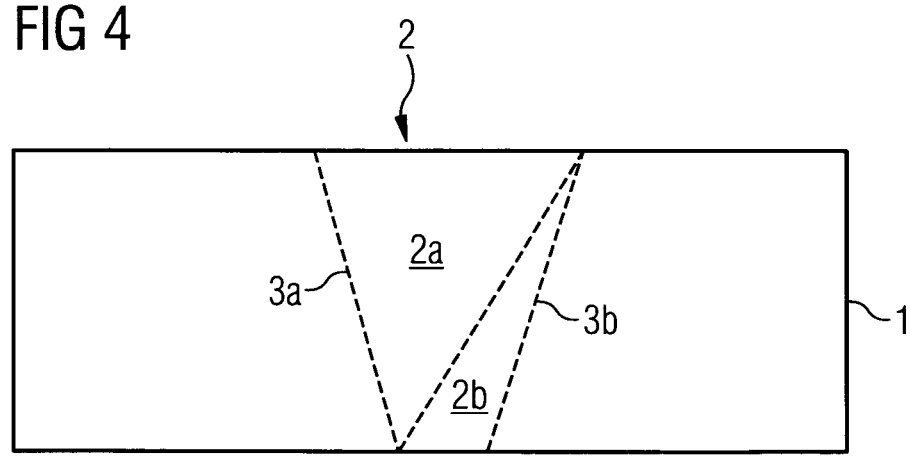
FIG. 4 shows a schematic view of the component of FIG. 1 in which a hole with alternative shape is to be produced with the method according to the invention.

FIG. 4 shows the component 1 of FIG. 1 in schematic view, wherein in this case an alternative hole geometry is indicated, which is defined by side-delimiting flanks 3a and 3b. In the case of the alternative hole geometry, the partial volumes 2a and 2b are arranged one above the other, wherein the partial volume 2b adjoins the outer surface of the component 1 preferably with the point, and wherein the partial volume 2a adjoins the inner surface of the component 1 preferably with the point.

The alternative hole 2 is produced in the way which is described above.

The invention claimed is:

1. A method for producing a hole with side-delimiting flanks in a component via a laser located at a top of the hole, the method comprising:
    removing a plurality of partial volumes of the hole such that each of the partial volumes is removed from the hole separately by tracing a side flank of the hole with a laser beam so that a material of the respective partial volume where the laser beam is directed is vaporized,
    until the respective partial volume is removed the tracing includes moving the laser when a portion of the side flank is exposed so the laser beam is directed to a further portion of the side flank located deeper relative to the top of the hole,
    wherein the laser beam is oriented so that it includes an angle of more than 8° with each traced side flank.

2. The method as claimed in claim 1, wherein the laser beam is oriented so the angle of is more than 10° and less than 90° with the traced flank.

3. The method as claimed in claim 2, wherein the laser beam is oriented so the angle of more is than 15° and less than 80° with the traced flank.

4. The method as claimed in claim 3, wherein the laser beam is oriented so the angle of more than 20° and less than 60° with the traced flank.

5. The method as claimed in claim 1, wherein the laser provides a pulsed laser beam.

6. The method as claimed in claim 5, wherein the pulsed laser beam has a variable pulse width.

7. The method as claimed in claim 6, wherein the pulsed laser beam has the pulse width in a range of 50 to 800 ns.

8. The method as claimed in claim 7, wherein the pulsed laser beam has the pulse width in a range of 70 to 600 ns.

9. The method as claimed in claim 8, wherein the pulsed laser beam has the pulse width in a range of 200 to 500 ns.

10. The method as claimed in claim 9, wherein the pulsed laser beam has the pulse width of 400 ns.

11. The method as claimed in claim 1, wherein the laser beam has a frequency in the range of 20 to 40 kHz.

12. The method as claimed in claim 11, wherein the laser beam has a frequency in the range of 25 to 35 kHz.

13. The method as claimed in claim 12, wherein the laser beam has a frequency in the range of 28 to 32 kHz.

14. The method as claimed in claim 1, wherein the hole is formed in a turbine component.

15. The method as claimed in claim 14, wherein the hole is a cooling air hole and the turbine component is a turbine blade.

16. The method as claimed in claim 14, wherein a diffuser opening of the cooling air hole is formed in the turbine blade.

17. The method as claimed in claim 1,
    wherein the orientation of the laser beam is changed for each partial volume.

18. The method as claimed in claim 1,
    wherein the side flank of at least one of the plurality of partial volumes extends the depth of the hole, the depth of the hole from a first surface of the hole to a second surface of the hole.

19. The method as claimed in claim 1,
    wherein the angle of the laser beam is not parallel to a center axis of the hole.

20. The method as claimed in claim 19, further comprising:
    changing the orientation of the laser beam relative to the center axis of the hole after at least one of the plurality of partial volumes is removed.

21. The method as claimed in claim 1,
    wherein the plurality of partial volumes consists of two partial volumes.

* * * * *